US007243200B2

(12) United States Patent
Day et al.

(10) Patent No.: US 7,243,200 B2
(45) Date of Patent: Jul. 10, 2007

(54) ESTABLISHING COMMAND ORDER IN AN OUT OF ORDER DMA COMMAND QUEUE

(75) Inventors: Michael Norman Day, Round Rock, TX (US); Charles Ray Johns, Austin, TX (US); Peichun Peter Liu, Austin, TX (US); Thuong Truong, Austin, TX (US); Takeshi Yamazaki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 10/891,772

(22) Filed: Jul. 15, 2004

(65) Prior Publication Data

US 2006/0015652 A1    Jan. 19, 2006

(51) Int. Cl.
*G06F 12/00*    (2006.01)
(52) U.S. Cl. .......................................... 711/163; 710/5
(58) Field of Classification Search ............... 711/163
See application file for complete search history.

(56) References Cited

U.S. PATENT DOCUMENTS

| 6,088,772 | A | * | 7/2000 | Harriman et al. ........... 711/158 |
| 6,205,494 | B1 | | 3/2001 | Williams |
| 6,513,109 | B1 | * | 1/2003 | Gschwind et al. .......... 712/200 |
| 6,609,192 | B1 | | 8/2003 | Guthrie et al. |
| 6,694,427 | B1 | * | 2/2004 | Mericas et al. ............. 712/227 |
| 7,073,043 | B2 | * | 7/2006 | Arimilli et al. ............. 711/207 |
| 2004/0187122 | A1 | * | 9/2004 | Gosalia et al. ............. 718/100 |
| 2004/0264284 | A1 | * | 12/2004 | Priborsky et al. ........... 365/232 |

FOREIGN PATENT DOCUMENTS

WO   PCT/IB2005/003974    7/2005

* cited by examiner

*Primary Examiner*—Brian R Peugh
*Assistant Examiner*—Hashem Farrokh
(74) *Attorney, Agent, or Firm*—Carr LLP; D'Ann N. Rifai

(57) ABSTRACT

A method, an apparatus, and a computer program are provided for controlling memory access. Direct Memory Access (DMA) units have become commonplace in a number of bus architectures. However, managing limited system resources has become a challenge with multiple DMA units. In order to mange the multitude of commands generated and preserve dependencies, embedded flags in commands or a barrier command are used. These operations then can control the order in which commands are executed so as to preserve dependencies.

17 Claims, 5 Drawing Sheets

ESTABLISHING COMMAND ORDER IN AN OUT OF ORDER DMA COMMAND QUEUE

CROSS REFERENCED APPLICATIONS

This application relates to co-pending U.S. patent applications entitled "METHOD FOR ASYNCHRONOUS DMA COMMAND COMPLETION NOTIFICATION" (application Ser. No. 10/448,237), filed on May 29, 2003.

BACKGROUND OF THE INVENTION

1. Field of the Invention

The present invention relates generally to Direct Memory Access (DMA) control and, more particularly, providing a mechanism for maintaining command ordering in a DMA control unit.

2. Description of the Related Art

In conventional systems, a Direct Memory Access (DMA) unit is a device that is capable of directly accessing memory, therefore bypassing a main processor. This type of system exists in some bus architectures. However, in order to have an efficient and orderly usage of the DMA unit in a system, there must be controls and limitations placed on DMA usage of memory.

A DMA Unit performs control of the DMA usage. Typically, a request or command for memory usage to the DMA Unit is made. The DMA Unit will act as a virtual gatekeeper to allow the requests or commands to be executed in an orderly fashion. However, there can be a number of DMA units that make requests or commands, a number of commands by a single DMA unit, or any combination thereof. To alleviate the problem of multiple requests clogging a system, a DMA Unit employs a queue to store the series of DMA unit requests or commands.

Typically, the series of DMA unit requests or commands are executed in the order in which the requests or commands arrive at the DMA Unit or are executed in a strict order. However, the strict order can be quite costly. There are a variety of problems that can arise as a result of strict order. For example, a high priority DMA command can be delayed by a low priority DMA command.

Another reason a strict ordering rule is quite costly is when virtual memory system is used for the DMA. If the translation from Virtual address to Real address is not available, the DMA unit must wait until the translation miss is resolved. Sometimes the translation miss can be resolved by hardware and other times the miss must be resolved by software. In either case, the latency of resolving the translation fault is very long. There are other cases, such as a DMA to or from a slow device will prevent DMA Commands further back in the queue with no dependencies on the present DMA command from being executed.

For loads and stores, some conventional systems, such as the PowerPC®, have been able to improve performance through the use of a weakly ordered or weakly consistent memory model. The concept of weakly ordered memory models can be extended to the execution of DMA commands. In the weakly ordered model for DMA Units, tags are associated with each command. The commands are completed in any order. However, the tags allow control software to monitor the order and group associated or dependant commands.

Allowing the completion of commands in any order, though, poses a number of problems. For example, if there is a requirement that a command completes prior to the execution of a subsequent command. Therefore, there is a need for a method and/or apparatus for ordering DMA commands that addresses at least some of the problems associated with conventional methods and apparatuses for executing DMA commands.

SUMMARY OF THE INVENTION

The present invention provides an apparatus for controlling memory access. At least one processor is provided, wherein the processor further comprises at least the ability to issue commands, and at least an ability to embed at least a flag into the commands associated with the tag number assigned. A plurality of communication ports is also provided, wherein a plurality of commands are input by the at least one processor through at least a first communication channel of a plurality of communication channels. Also, a tag queue is provided, wherein the tag queue assigns a tag number to each command of the plurality of commands to generate a plurality of tagged commands. A command queue for storing the plurality of tagged commands is also provided, wherein the command queue further comprises an ability to sort the commands.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
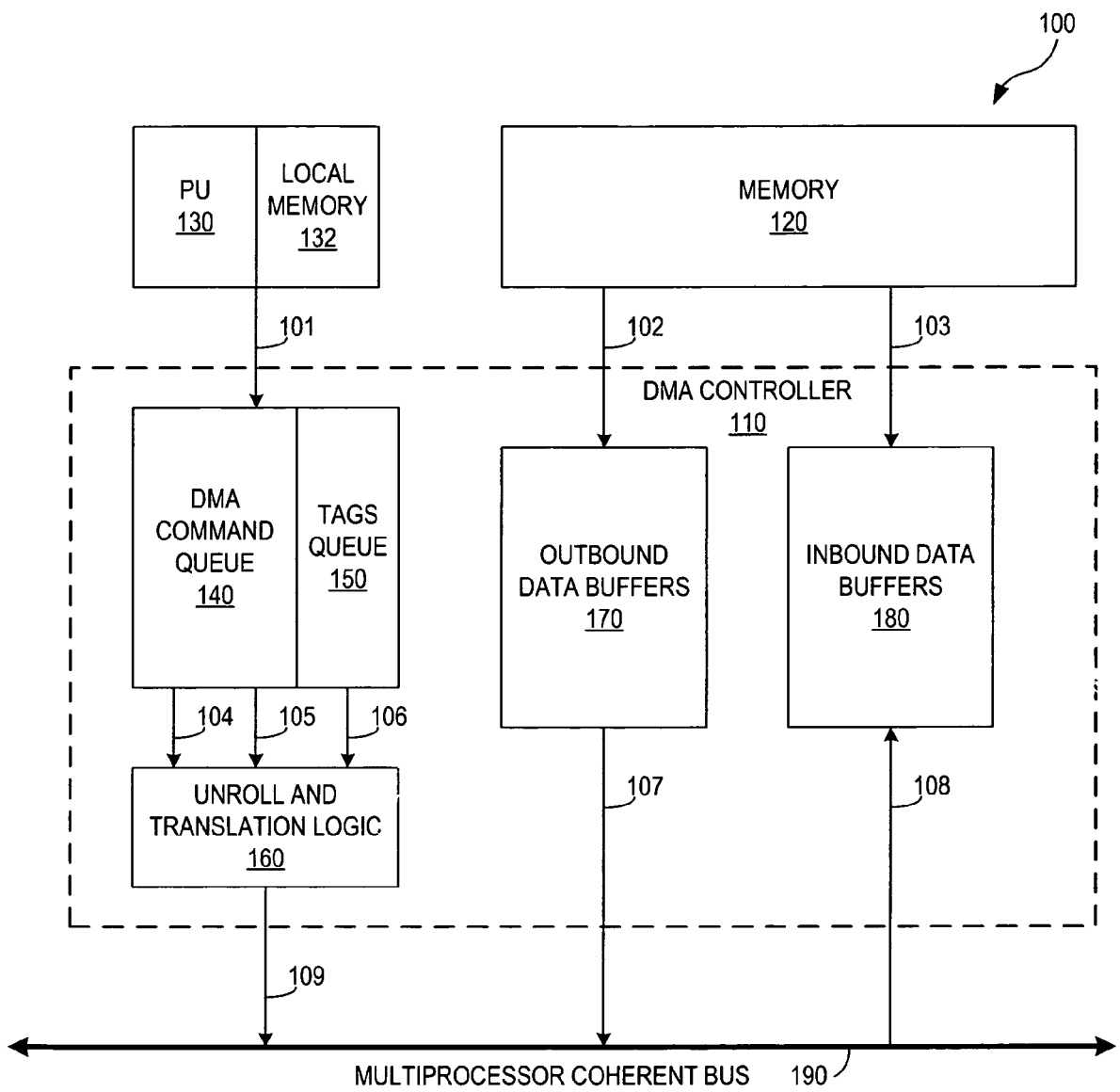
FIG. 1 is a block diagram depicting a system with an improved DMA controller.

Referring to FIG. 1 of the drawings, the reference numeral 100 generally designates a system with an improved DMA controller. The system 100 comprises an improved DMA controller 110, a PU 130, memory unit 132, memory 120, and a Multiprocessor (MP) coherent bus 190. The improved DMA controller 110 further comprises a DMA command queue 140, tags queue 150, unroll and translation logic 160, outbound data buffers 170, and inbound data buffers 180.

In the system 100 with the improved DMA controller 110, commands are issued and executed. The PU 130 with memory unit 132 issues commands to the DMA command queue 140. The PU 130 can be any type of processor, including, a Main PU (MPU) or a Synergistic PU (SPU). The memory unit 132 can be a variety of memory types including, but not limited to, a cache. The commands sent to the DMA command queue 140 are tagged, and the tags for the respective commands are tracked in the tag queue 150. The tags can be individual to the command or specific to a certain types of commands, thus creating tag groups. From the DMA command queue 140, write and read commands are issued to various components, including system memory (not shown). Then, the transfer of data occurs through the outbound data buffers 170 and the inbound data buffers 180. There can also be a number of other steps incorporated into execution of a command, such as decoding.

However, commands in DMA command queue 140 are not simply executed at random. In conventional systems, the commands in the DMA command queue, such as the DMA command queue 140, are executed in the order of arrival under a strict ordering scheme. The improved DMA controller 110, though, utilizes a weak ordering scheme to allow for execution in a variety of orders. Moreover, the improved DMA controller 110 also utilizes a series of embedded flags. The PU 130 embeds the flags into the commands issued. It is possible though, for the fence and barrier flags to be embedded by the DMA Controller 140; however, it is more complex. Also, the embedded flags act as dependencies for each command and are for the benefit of sequential execution of the commands. There are a variety of other reasons for utilizing embedded flags, for example executing high priority commands before low priority commands.

More particularly, there are two flags that can be embedded into a command: barrier and fence. Both affect only commands in the same tag group. Typically, the embedded fence flag will not allow the command to executed until all commands, within the same tag group issued prior to the command with the embedded fence flag are compete. The fence flag requires that all commands within the same tag group issued prior to the command with the embedded fence be completed prior to the execution of the command with the fence flag. The fence flag does not affect subsequent commands in the queue. For example, a command issued after a command with a fence can execute before the command with the fence.

The barrier flag, on the other hand, affects all previous and subsequent commands within the same tag group. Typically, the barrier flag will not allow any subsequent commands within the same tag group to be executed before the execution of commands issued prior to the command with barrier flag, including the command with the barrier flag. For example, commands, within the same tag group, issued after a command with a barrier cannot execute before the command with the barrier. Typically, when all commands within the same tag group issued prior to the command with the barrier are complete, the command with the barrier flag and subsequent commands within the same tag group can be executed. Hence, once the barrier is cleared, then the normal out of order operations can continue.

The PU 130 also has the capability of issuing a barrier command instead of embedding a fence or barrier flag. The barrier command operates on all commands in the queue. All subsequent commands are prevented by the barrier command, regardless of the tag, from being executed until all previously issued commands are complete. Once the barrier is cleared, then the normal out of order operations can continue.

In comparing the barrier command and the flags, there are some subtle, but meaningful, differences. The tag specific flags embedded in the command, as the name implies, act only on commands within the same tag group, whereas the barrier command act on all tag groups. The barrier flag and the barrier command though do have similar characteristics in that each affect previously and subsequently issued command. However, the scope of effect of the two commands differs.

In order for the improved DMA system 100 to operate, there are a series of necessary connections. The PU 130 is coupled to the memory unit 132 through a first communication channel (not shown). Also, the PU 130 is coupled to the DMA command queue 140 through a second communication channel 101. The memory unit 132 is coupled to the memory through a third communication channel 112. The memory 120 is coupled the outbound data buffers 170 through a fourth communication channel 102. The memory 120 is also coupled to the inbound data buffers 108 through a fifth communication channel 103. The DMA command queue is coupled to the unroll and translation logic 160 through a sixth communication channel 104 and through a seventh communication channel 105. The sixth communication channel 104 transmits the command, and the seventh communication channel 105 transmits the embedded flag. The tag queue 150 is coupled to the unroll and translation logic 160 through an eighth communication channel 106. The outbound data buffers 170 are coupled to the MP coherent bus 190 through a ninth communication channel 107. The inbound data buffers are connected to the MP coherent bus through a tenth communication channel 108. The unroll and translation logic 160 is coupled to the MP coherent bus through an eleventh communication channel 109.

Figure 2:
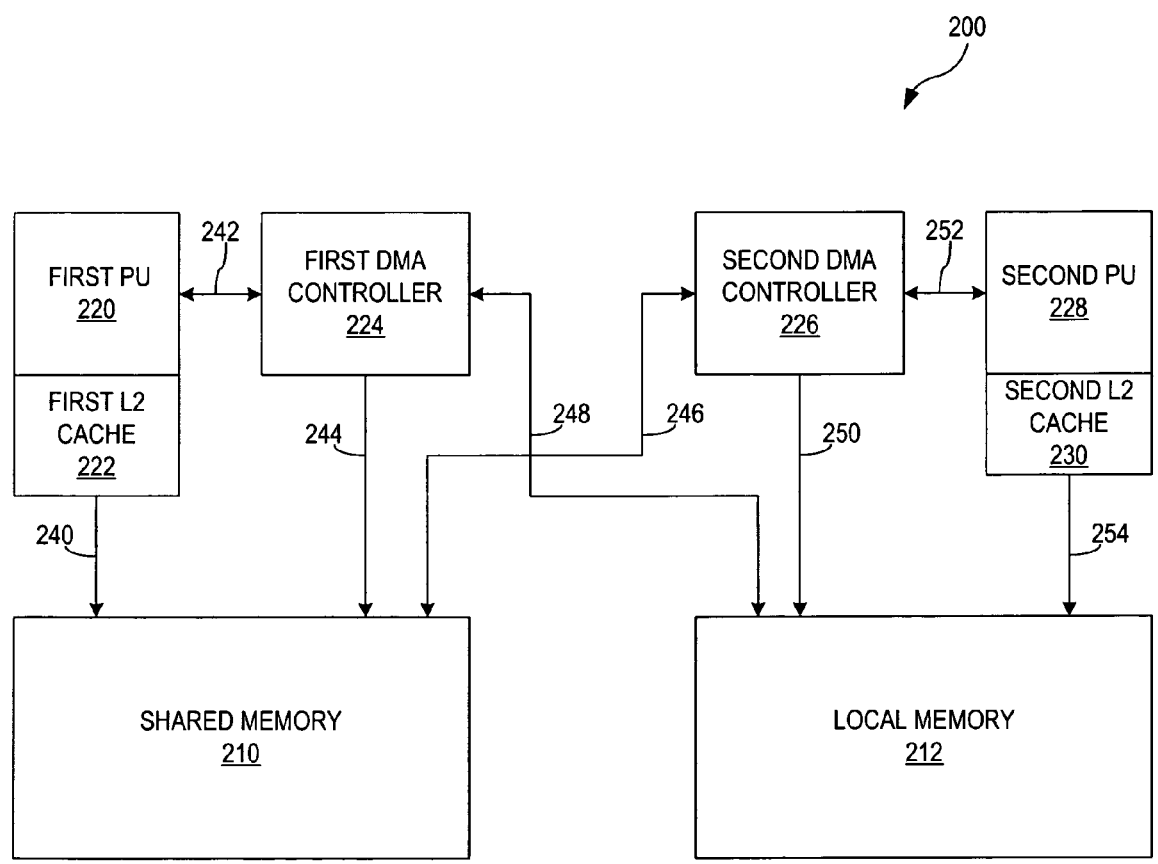
FIG. 2 is a block diagram depicting a Multiprocessor (MP) system.

Referring to FIG. 2 of the drawings, the reference numeral 200 generally designates an MP system. The MP system comprises a shared memory 210, local memory 212, a first PU 220, a first Level 2 (L2) cache 222, a first DMA controller 224, a second DMA controller 226, a second PU 228, and a second L2 cache 230. The first L2 cache 222 and the second L2 cache 230 are well-known and operate as external memory interface for their respective processors.

In the MP system 200, the multiple processors can operate independently or in conjunction to read or write data from a variety of memory devices. The PU 220 can issue a variety of types of commands to the first DMA controller 224, such as read commands, write commands, and so forth. The second PU 228 can also issue a variety of types of commands to the second DMA controller 226, such as read commands, write commands, and so forth. The first DMA controller 224 and the second DMA controller 226 can read and write data from either the local memory 212 or the shared memory 210. Also, there can be multiple PUs or a single PU, as shown in FIG. 2, for each DMA controller. Conversely, there can also be multiple DMA controllers or a single DMA controller, as shown in FIG. 2. Also, there can be a single or multiple PUs, as shown in FIG. 2.

In order for the MP system 200 to operate, there are a series of necessary connections. The PU 220 is interconnected to the first L2 cache 222 through a twelfth communication channel (not shown). The PU 220 is also coupled to the first DMA Controller 224 through a thirteenth communication channel 242. The first L2 cache 222 is coupled to the shared memory 210 through a fourteenth communication channel 240. The first DMA controller 224 is couple to the shared memory 210 through a fifteenth communication channel 244. The first DMA controller 224 is also connected to the local memory 212 through a sixteenth communication channel 248. The second PU 228 is interconnected to the second L2 cache 230 through a seventeenth communication channel (not shown). The second L2 cache 230 is coupled to the local memory 212 through an eighteenth communication channel 254. The second PU 228 is also coupled to the second DMA controller 226 through a nineteenth communication channel 252. The second DMA controller 226 is coupled to the local memory through a twentieth communication channel 250. The second DMA controller 226 is also coupled to the shared memory 210 through a twenty-first communication channel 246.

Figure 3:
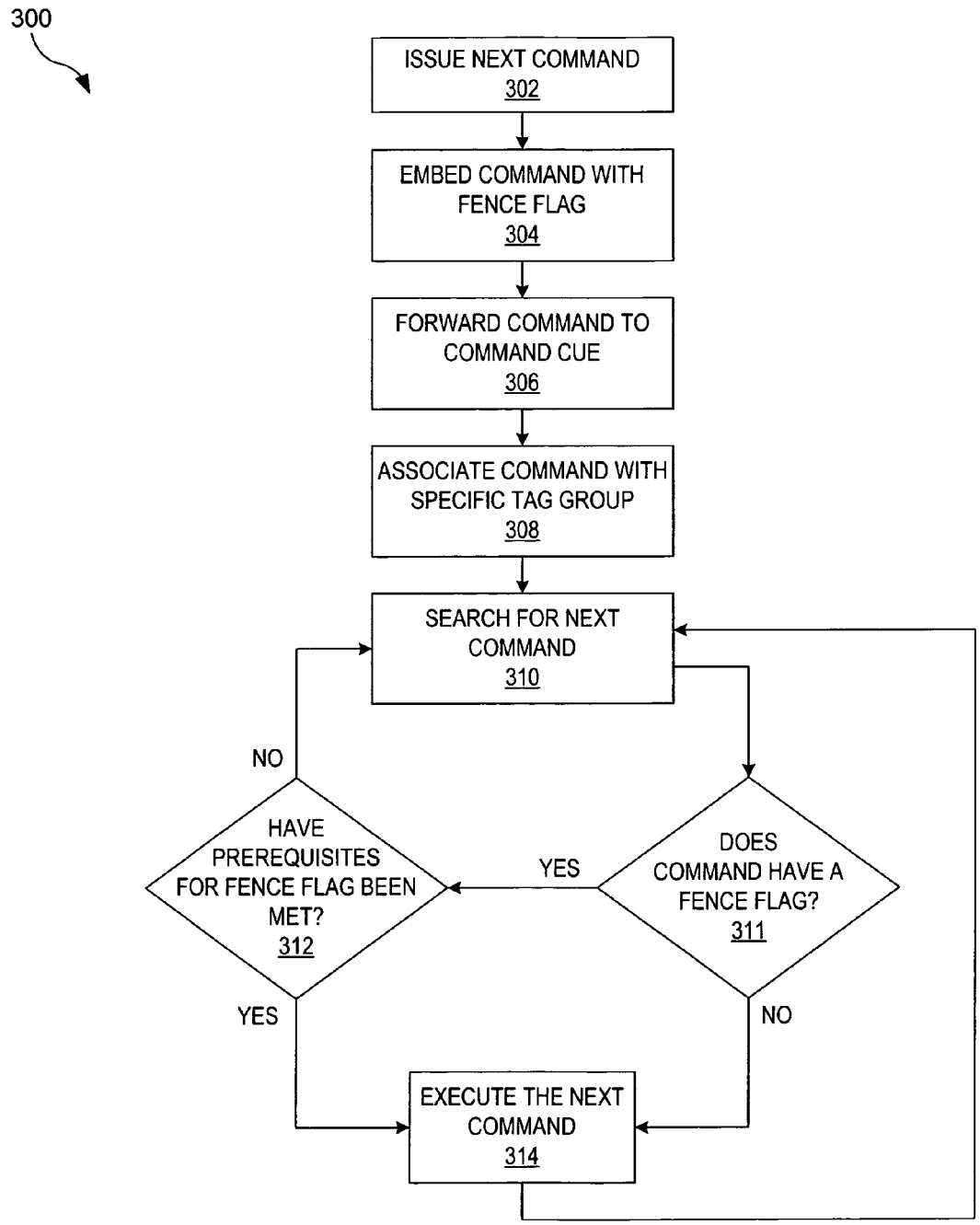
FIG. 3 is a flow chart depicting the operation of a fence flag with the improved DMA controller system.
Figure 4:
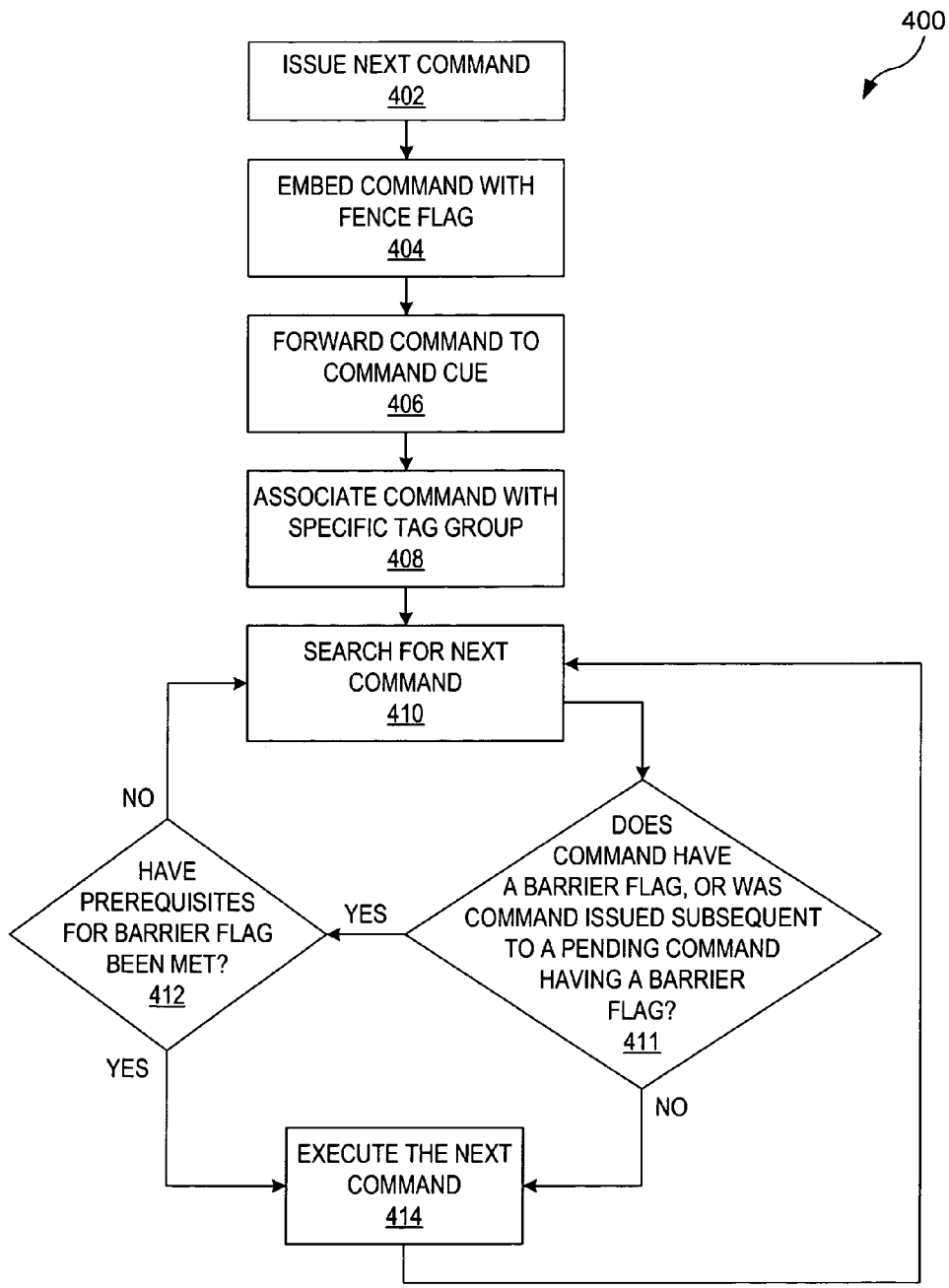
FIG. 4 is a flow chart depicting the operation of a barrier flag within an improved DMA controller system.
Figure 5:
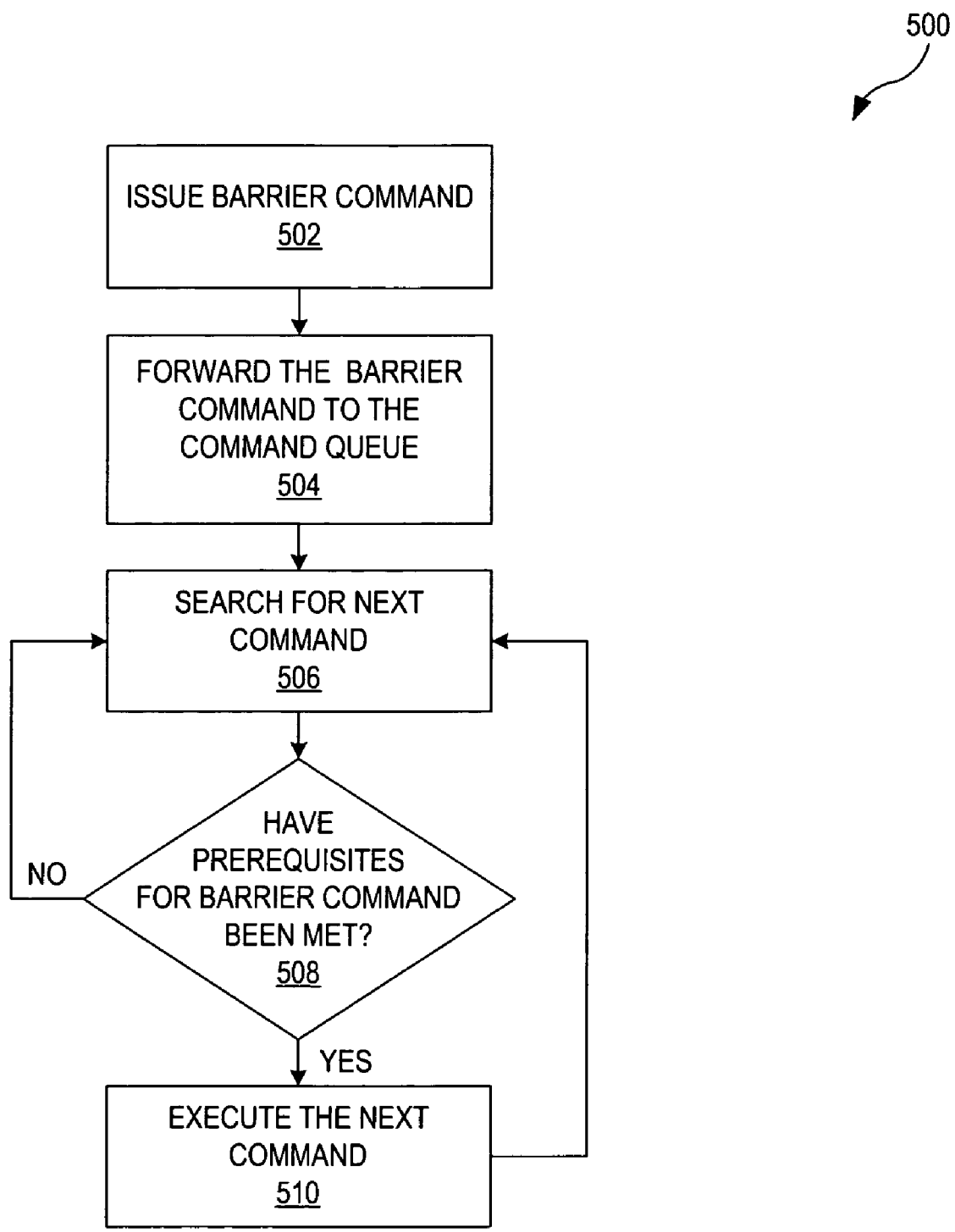
FIG. 5 is a flow chart depicting the operation of a barrier command within an improved DMA controller system.

FIGS. 3, 4, and 5 are flow charts depicting the operation of the embedded fence, embedded barrier, and barrier commands respectively. These flow charts are simplified to show only the existence of a single embedded flag or barrier command. However, there can be multiple flags and/or commands used in combination.

Referring to FIG. 3 of the drawings, the reference numeral 300 generally designates a flow chart depicting the operation of a fence flag with the improved DMA controller. Also, FIG. 3 does not depict the utilization of any other types of flags.

In steps 302 and 304, commands are issued and embedded with a fence flag, respectively. A PU 130 of FIG. 1 issues the command in step 302. The command can be a variety of types of commands, such as a read command, a write command, and so forth. The command is embedded with a fence flag in step 304. Embedding the command with the fence flag is performed by the PU 130 of FIG. 1 using an application and/or a compiler. The fence flag can be embedded for a variety of reasons. For example, a fence flag can be embedded for sequential execution of this command with respect to all commands previously issued with the same tag. The fence flag can be embedded in a variety of commands, such as a read command. Also, the fence flag affects only commands within the same tag group. In addition, the PU 130 of FIG. 1 assigns a tag to the command when issued in step 302.

In steps, 306 and 308, the command is forwarded and associated with a tag group. The PU 130 of FIG. 1 forwards the issued and embedded command to the DMA command queue 140 for temporary storage in step 306. Once received, the command is associated with a specific tag group based on the assigned tag in step 308.

In steps 310, 311 and 314, the next command from the DMA command queue slated for execution is sought. In step 310, the DMA command queue is searched for the next available command. Typically, commands are selected based on age relative to other commands in the command queue, such as the oldest command in the command queue. Once the next command is selected, a determination is made as to whether the command has an embedded fence flag in step 311. If the command does not have an embedded fence flag, then the command can be executed in step 314. However, if there is an embedded fence flag, then another set of steps should be employed.

If in step 311 the command is determined to have an embedded fence flag, then, in step 312, the command's execution prerequisites are checked. The fence flag requires that all commands within the same tag group issued prior to the command with the embedded fence be completed prior to the execution of the command with the fence flag. If the command's execution prerequisites are not met, the command remains in the DMA command queue, and step 310 and 311 are repeated to search for a command that can be executed. The command will remain in the DMA command queue until the command's execution prerequisites are met. Hence, in step 310, the next command to be executed should be a command with the same tag issued prior to the issuance of the command with the embedded fence flag. If the next slated command was issued subsequent to the issuance of the fence flag, then the DMA controller 110 of FIG. 1 can execute the subsequent command, regardless of the tag. However, the DMA controller 110 of FIG. 1 should continue to search the command queue for any previously issued commands. If no previous commands exist within the same tag group, then the requirements for the embedded fence are met and the command with the embedded fence flag can be executed. However, the command with the embedded fence flag cannot be executed until there are no longer any previously issued commands, which are not complete.

Steps 310 through 314 are executed in parallel with steps 302 through 308. Steps 302 through 308 are repeated when the PU 130 of FIG. 1 issues a command. Steps 310 through 314 are continuously executed until no commands remain in the DMA command queue.

Referring to FIG. 4 of the drawings, the reference numeral 400 generally designates a flow chart depicting the operation of a barrier flag with the improved DMA controller. Also, FIG. 4 does not depict the utilization of any other types of flags.

In steps 402 and 404, commands are issued and embedded with a barrier flag, respectively. A PU 130 of FIG. 1 issues the command in step 402. The command can be a variety of types of commands, such as a read command, a write command, and so forth. The command is embedded with a barrier flag in step 404. Embedding the command with the barrier flag is performed by the PU 130 of FIG. 1 using an application and/or a compiler. The barrier flag can be embedded for a variety of reasons. For example, a barrier flag can be embedded for sequential execution of this command and all subsequent commands within the same tag group with respect to all commands previously issued with the same tag. The barrier flag can be embedded in a variety of commands, such as a read command. Also, the barrier flag affects only commands within the same tag group. In addition, the PU 130 of FIG. 1 assigns a tag to the command when issued in step 402.

In steps, 406 and 408, the command is forwarded and associated with a tag group. The PU 130 of FIG. 1 forwards the issued and embedded command to the DMA command queue 140 for temporary storage in step 406. Once received, the command is associated with a specific tag group based on the assigned tag in step 408.

In steps 410, 411 and 414, the next command from the DMA command queue slated for execution is sought. In step 410, the DMA command queue is searched for the next available command. Typically, commands are selected based on age relative to other commands in the command queue, such as the oldest command in the command queue. Once the next command is selected, a determination is made as to whether the command has an embedded barrier flag in step 411. If the command does not have an embedded barrier flag, then the command can be executed. However, if there is an embedded barrier flag, then another set of steps should be employed.

If in step 411 the command is determined to have an embedded barrier flag, then, in step 412, the command's execution prerequisites are checked. The barrier flag requires that all commands within the same tag group issued prior to the command with the embedded fence be completed prior to the execution of any commands issued after the command with the barrier flag. If the command's execution prerequisites are not met, the command remains in the DMA command queue, and step 410 and 411 are repeated to search for a command that can be executed. The command will remain in the DMA command queue until the command's execution prerequisites are met. Hence, in step 410, the next command to be executed should be a command with the same tag issued prior to the issuance of the command with the embedded barrier flag. If the next slated command is within the same tag group and was issued subsequent to the issuance of the command with the barrier flag and the barrier requirements are not satisfied, then the check in step 412 will fail and the DMA controller 110 of FIG. 1 cannot execute the subsequent command. The DMA controller 110 of FIG. 1 should continue to search the command queue for any previously issued commands. If no previous commands within the same tag group exist, then the requirements for the embedded barrier are met and the command with the embedded barrier flag and all subsequent issued commands within the same tag group can be executed. If the next slated command for execution is not within the same tag group, the DMA controller 110 of FIG. 1 can execute the command.

Steps 410 through 414 are executed in parallel with steps 402 through 408. Steps 402 through 408 are repeated when the PU 130 of FIG. 1 issues a command. Steps 410 through 414 are continuously executed until no commands remain in the DMA command queue.

Referring to FIG. 5 of the drawings, the reference numeral 500 generally designates a flow chart depicting the operation of a barrier command with the improved DMA controller. Also, FIG. 5 does not depict the utilization of any other types of flags.

In steps 502 and 504, barrier command is issued and forwarded to the DMA command queue 140 of FIG. 1, respectively. A PU 130 of FIG. 1 issues the barrier command in step 502. The barrier creates a dependency for all subsequently issued commands. The dependency requires that all commands issued prior to the barrier command be completed. In essence, the barrier command prevents the execution of any subsequently issued commands until all previous commands have been executed, regardless of the tag group. The barrier command can be utilized for a variety of reasons. For example, a barrier command can be utilized for sequential execution of this command and all subsequent commands with respect to all commands previously issued. In step 504, the PU 130 of FIG. 1 forwards the issued barrier command to the DMA command queue 140 for temporary storage.

In steps 506, 508, and 510, the next command from the DMA command queue slated for execution is sought. In step 510, the DMA command queue is searched for the next available command. Typically, commands are selected based on age relative to other commands in the command queue, such as the oldest command in the command queue. In step 508, the command's execution prerequisites are checked. The barrier command requires that all commands issued prior to the barrier command be completed prior to the execution of any commands issued after the barrier command, regardless of the tag group. If the command's execution prerequisites are not met, the command remains in the DMA command queue, and step 506 and 508 are repeated to search for a command that can be executed. The command will remain in the DMA command queue until the command's execution prerequisites are met. Hence, in step 506, the next command to be executed should be a command issued prior to the issuance of the barrier command. If the next slated command was issued subsequent to the issuance of the barrier command and the barrier requirements are not satisfied, then the check in step 508 will fail and the DMA controller 110 of FIG. 1 cannot complete the barrier command or execute the subsequent command. The DMA controller 110 of FIG. 1 should continue to search the command queue for any previously issued commands. If no previous commands exist, then the requirements for the barrier command and dependency on all subsequently issued commands are met. Once the dependencies created by the barrier command are resolved, all commands issued subsequent to the issuance of the barrier command can be executed.

Steps 506 through 510 are executed in parallel with steps 502 and 504. Steps 502 and 504 are repeated when the PU 130 of FIG. 1 issues a barrier command. Steps 506 through 510 are continuously executed until no commands remain in the DMA command queue.

It will further be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. An apparatus for controlling memory access, comprising:
   at least one processor, wherein the processor further comprises:
      the ability to issue commands including a barrier command; and
      an ability to embed a flag into an issued command;
   a plurality of communication ports, wherein a plurality of commands are input by the at least one processor through at least a first communication channel of a plurality of communication channels;
   a tag queue, wherein the tag queue assigns a tag number to each issued command to generate a plurality of tagged commands, wherein each tagged command is associated with the assigned tag number;
   a command queue for storing the tagged commands, wherein the command queue further comprises an ability to sort the tagged commands; and
   wherein the barrier command prevents execution of any of the tagged commands issued after the barrier command.

2. The apparatus of claim 1, wherein the apparatus further comprises intermediate logic, wherein the intermediate logic at least transfers at least one tagged command from the command queue to at least a second communication channel.

3. The apparatus of claim 2, wherein the apparatus further comprises a plurality of data buffers, wherein the plurality of data buffers are at least configured to be couple to at least a memory.

4. The apparatus of claim 3, wherein the plurality of data buffers are at least configured to be coupled to the second communication channel.

5. The apparatus of claim 1, wherein the tag numbers allow the tagged commands to be grouped, thereby forming a plurality of tag groups.

6. The apparatus of claim 5, wherein the processor is configured to embed a fence flag into an issued command, and wherein the fence flag requires that all commands within a tag group including the command with the embedded fence flag and issued prior to the command with the embedded fence flag be completed prior to the execution of the command with the embedded fence flag.

7. The apparatus of claim 5, wherein the processor is configured to embed a barrier flag into an issued command, and wherein the barrier flag requires that all commands within a tag group including the command with the embedded barrier flag and issued prior to the command with the embedded barrier flag be completed prior to the execution of any command issued after the command with the embedded barrier flag.

8. A method for controlling memory access, comprising:
receiving a first command from a processor to a control module to perform a memory operation;
embedding an flag in the first command to generate an embedded flag;
tagging the first command with a tag number;
queuing the first command in a command list;
ordering the command list at least based on an entry sequence into the control module and at least based on the embedded flags; and
executing the command list in order of the ordering.

9. The method of claim 8, wherein the method further comprises associating commands with same tag number into a tag group.

10. The method of claim 9, wherein the flag further comprises a fence flag to prevent execution of at least one command with an embedded fence flag in a first tag group issued until all commands issued prior to the at least one command with an embedded fence flag are executed.

11. The method of claim 8, wherein the flag further comprises a barrier flag to prevent execution of any subsequent commands issued after at least one command embedded the barrier flag.

12. A method for controlling memory access, comprising:
receiving a plurality of commands from a processor, wherein each command performs a memory operation;
assigning a tag number to each of the commands;
using the tag numbers to assign each of the commands to one of a plurality of tag groups;
queuing the commands in a command list;
issuing a barrier command to prevent execution of any commands issued after the barrier command, regardless of tag group;
ordering the command list; and
executing the command list according to the ordering.

13. A computer program product for controlling memory access, the computer program product having a medium with a computer program embodied thereon, the computer program comprising:
computer program code for receiving a first command from a processor to a control module to perform a memory operation;
computer program code for embedding an flag in the first command to generate an embedded flag;
computer program code for tagging the first command with a tag number;
computer program code for computer program code for queuing the first command in a command list;
computer program code for ordering the command list based on an entry sequence into the control module and embedded flags; and
computer program code for executing the command list in order of the ordering.

14. The computer program product of claim 13, wherein the method further comprises computer program code for associating commands with same tag number into a tag group.

15. The computer program product of claim 14, wherein the flag further comprises a fence flag to prevent execution of at least one command with an embedded fence flag in a first tag group issued until all commands issued prior to the at least one command with an embedded fence flag are executed.

16. The computer program product of claim 13, wherein the flag further comprises a barrier flag to prevent execution of any subsequent commands issued after at least one command embedded the barrier flag.

17. A computer program product for controlling memory access, the computer program product having a medium with a computer program embodied thereon, the computer program comprising:
computer program code for receiving a plurality of commands from a processor, wherein each command performs a memory operation;
computer program code for assigning a tag number to each of the commands;
computer program code for using the tag numbers to assign each of the commands to one of a plurality of tag groups;
computer program code for queuing the commands in a command list;
computer program code for issuing a barrier command to prevent execution of any commands issued after the barrier command, regardless of tag group;
computer program code for ordering the command list; and
computer program code for executing the command list according to the ordering.

* * * * *